(12) United States Patent
Hashimoto et al.

(10) Patent No.: US 12,487,093 B2
(45) Date of Patent: Dec. 2, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Osami Hashimoto, Mishima (JP); Hiroki Tashima, Fujisawa (JP); Toshihiko Inoue, Nagoya (JP); Kazuma Toya, Anjo (JP); Takashi Tazoe, Nagoya (JP); Ryota Bingo, Nisshin (JP); Kosuke Sakakibara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 18/463,735

(22) Filed: Sep. 8, 2023

(65) Prior Publication Data

US 2024/0159550 A1 May 16, 2024

(30) Foreign Application Priority Data

Nov. 14, 2022 (JP) ................................ 2022-182085

(51) Int. Cl.
*G01C 21/34* (2006.01)
(52) U.S. Cl.
CPC ..... *G01C 21/3461* (2013.01); *G01C 21/3484* (2013.01)
(58) Field of Classification Search
CPC ............ G01C 21/3461; G01C 21/3484; G01C 21/3815; G01C 21/3852; G01C 21/3446
USPC .......................................................... 701/468
See application file for complete search history.

(56) References Cited

U.S. PATENT DOCUMENTS

| | | | |
|---|---|---|---|
| 2014/0095063 A1* | 4/2014 | Saraswat | G06Q 30/0224 701/410 |
| 2014/0205154 A1* | 7/2014 | De Souza | G06V 20/188 382/110 |
| 2015/0382278 A1* | 12/2015 | Fallon | H04W 40/10 370/338 |
| 2017/0030728 A1* | 2/2017 | Baglino | G01C 21/3469 |
| 2018/0058875 A1* | 3/2018 | Wan | G01C 21/3641 |
| 2018/0356245 A1* | 12/2018 | Schein | G01C 21/20 |
| 2020/0256694 A1* | 8/2020 | Ueda | G08G 1/096888 |
| 2021/0011475 A1* | 1/2021 | Haputhanthri | G05D 1/0088 |
| 2023/0127182 A1* | 4/2023 | Mayster | G06V 20/182 701/423 |

FOREIGN PATENT DOCUMENTS

| | | |
|---|---|---|
| JP | 2007-271299 A | 10/2007 |
| JP | 2013-096704 A | 5/2013 |
| JP | 2017-097222 A | 6/2017 |

* cited by examiner

*Primary Examiner* — Helal A Algahaim
*Assistant Examiner* — Patrick M Brady
(74) *Attorney, Agent, or Firm* — SoraIP, Inc.

(57) ABSTRACT

The information processing device acquires a satellite image captured by an artificial satellite in a range from a current position of the vehicle to a destination, acquires preference information regarding a preference of the driver, evaluates a traveling route to the destination based on the satellite image and the preference information, and outputs an evaluation result of the traveling route.

11 Claims, 5 Drawing Sheets

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2022-182085 filed on Nov. 14, 2022, incorporated herein by reference in its entirety.

BACKGROUND

1. Technical Field

The present disclosure relates to an information processing device, an information processing method, and a program.

2. Description of Related Art

Japanese Unexamined Patent Application Publication No. 2007-271299 (JP 2007-271299 A) discloses a navigation device that performs route guidance. Specifically, the navigation device described in JP 2007-271299 A displays landscape information to a user at a predetermined branch point at the time of route guidance.

SUMMARY

However, in a configuration in which a route is selected based only on the landscape information as in the device described in JP 2007-271299 A, the device cannot provide a driver with sufficient added value.

An object of the present disclosure is to provide an information processing device, an information processing method, and a storage medium capable of providing added value to a driver.

An information processing device according to claim 1: acquires a satellite image captured by a satellite in a range from a current position of a vehicle to a destination; acquires preference information about a preference of a driver; evaluates a traveling route to the destination based on the satellite image and the preference information; and outputs an evaluation result of the traveling route.

In the information processing device according to claim 1, the traveling route is evaluated based on the satellite image and the preference information of the driver. This makes it possible to evaluate the traveling route in accordance with the preference of the driver more highly than the configuration in which the traveling route is proposed based only on the landscape information. In particular, by using the satellite image, information that cannot be obtained by information recorded in a server or the like can be obtained in real time. Therefore, a driving environment with high added value can be provided to the driver.

The information processing device according to claim 2, in claim 1, proposes, to the driver, the traveling route that is highly evaluated.

The information processing device according to claim 2 proposes, to the driver, the traveling route that is highly evaluated, so that the driver can confirm the traveling route that is highly evaluated. Here, the traveling route that is highly evaluated is not limited to one traveling route, and includes a case where a plurality of the traveling routes that is highly evaluated is proposed.

In the information processing device according to claim 3, in claim 2, when the driver tends to prefer a traveling route having a large amount of nature from the preference information, the information processing device highly evaluates a traveling route having a high green visibility based on the satellite image.

In the information processing device according to claim 3, it is possible to propose the traveling route having a high green visibility to the driver who prefers the traveling route having a large amount of nature.

In the information processing device according to claim 4, in claim 1, when the driver tends to prefer a specific category of plant from the preference information, the information processing device evaluates a traveling route on which the plant is visible based on the satellite image.

In the information processing device according to claim 4, it is possible to propose the traveling route on which the plant is visible to the driver who prefers the specific category of plant.

In the information processing device according to claim 5, in claim 1, the information processing device identifies an event being executed in a range to a destination based on the satellite image, and outputs information about the event when the event is included in the preference information.

In the information processing device according to claim 5, it is possible to identify the event being executed in the vicinity of the traveling route in real time by the satellite image. Thus, it is possible to notify the driver that the event is being executed. Here, the event is not limited to an outdoor event such as a festival, fireworks, a parade, or the like, and is a concept broadly including an event in which contents can be grasped from the outdoors by the satellite image, such as sales information of a department store.

In the information processing device according to claim 6, in claim 1, the information processing device proposes, to the driver, a plurality of the traveling routes that is highly evaluated, and updates the preference information according to the traveling route selected by the driver.

In the information processing device according to claim 6, the preference information is updated in accordance with the traveling route selected by the driver. Thus, even when the preference of the driver changes, the preference information can be maintained in the latest state.

An information processing method according to claim 7: acquires a satellite image captured by a satellite in a range from a current position of a vehicle to a destination; acquires preference information about a preference of a driver; evaluates a traveling route to the destination based on the satellite image and the preference information; and outputs an evaluation result of the traveling route.

In a storage medium according to claim 8, a program: acquires a satellite image captured by a satellite in a range from a current position of a vehicle to a destination; acquires preference information about a preference of a driver; evaluates a traveling route to the destination based on the satellite image and the preference information; and outputs an evaluation result of the traveling route.

As described above, with the information processing device, the information processing method, and the program according to the present disclosure, it is possible to provide added value to the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing system S including the information processing device 10 according to the embodiment will be described with reference to the drawings.

Figure 1:
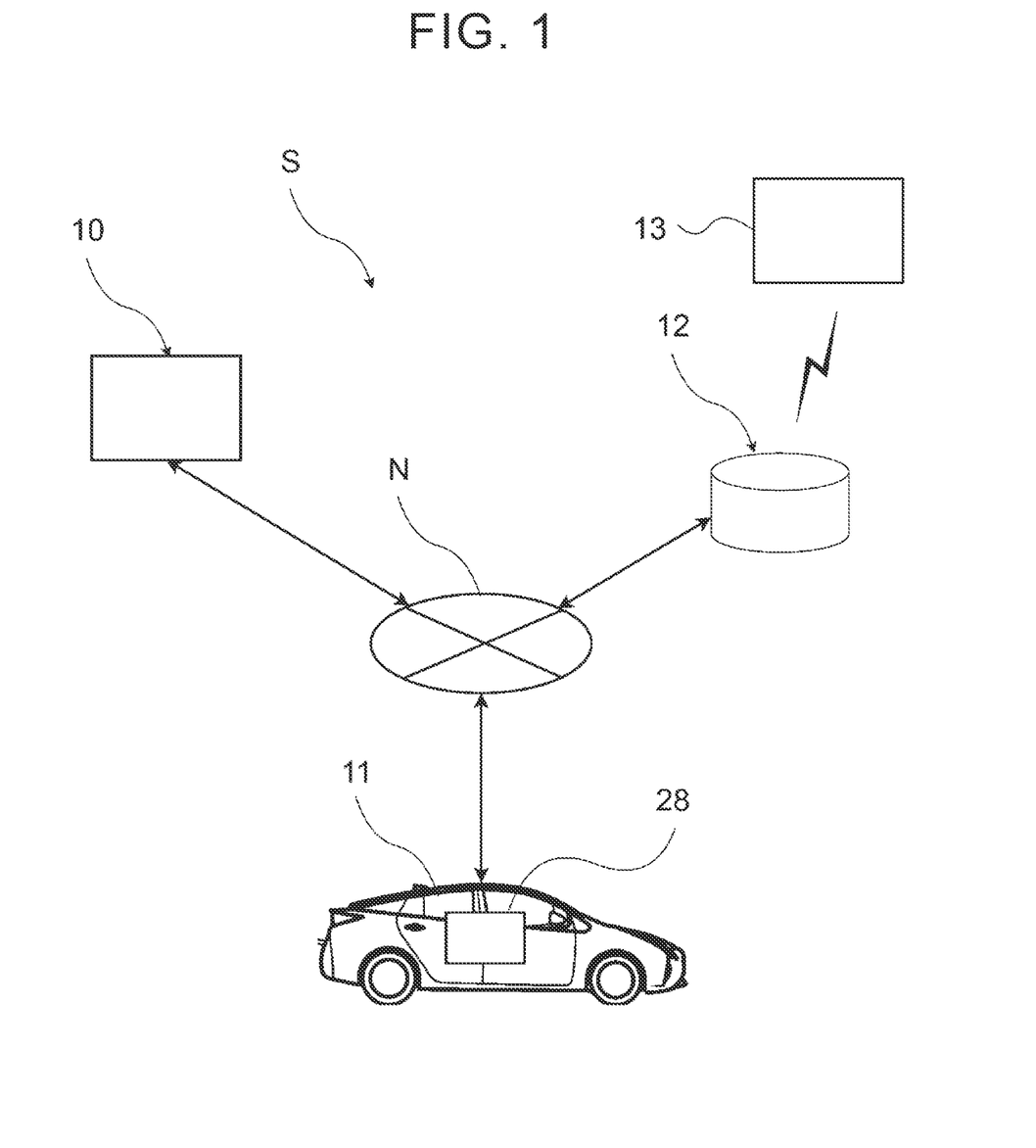
FIG. 1 is a schematic diagram schematically illustrating an entire system according to an embodiment.

As illustrated in FIG. 1, the information processing system S according to the present embodiment includes an information processing device 10, a server 12, and a vehicle 11. The information processing device 10, the server 12, and the vehicle 11 are connected via a network N. The information processing device 10, the server 12, and the vehicle 11 can communicate with each other.

The information processing device 10 is installed outside the vehicle 11, for example. The information processing device 10 is configured to transmit the requested information in response to an instruction from the vehicle 11. Further, the information processing device 10 is configured to be able to acquire various kinds of information from the server 12 via the network N. The information processing device 10 may be connected to a plurality of vehicles 11 via a network N.

The vehicle 11 includes a vehicle-mounted device 28. The vehicle-mounted device 28 of the present embodiment is, for example, an Electronic Control Unit (ECU) that performs various controls. The server 12 is installed outside the vehicle 11. The server 12 is configured to receive data from the artificial satellite 13. Therefore, the server 12 stores satellite images captured by the artificial satellites. In addition, preference information related to the preference of each occupant is sequentially accumulated in the server 12. The preference information stored in the server 12 may be based on information input by the occupant, or may be obtained from the purchase history of the occupant, profile information, or the like.

The information processing device 10 of the present embodiment acquires the satellite image and the preference information captured by the satellite 13 via the server 12. Further, the information processing device 10 evaluates the travel route from the current location to the destination of the vehicle 11 based on the satellite image and the preference information, and outputs the evaluation result of the traveling route.

Hardware Configuration of the Information Processing Device 10

Figure 2:
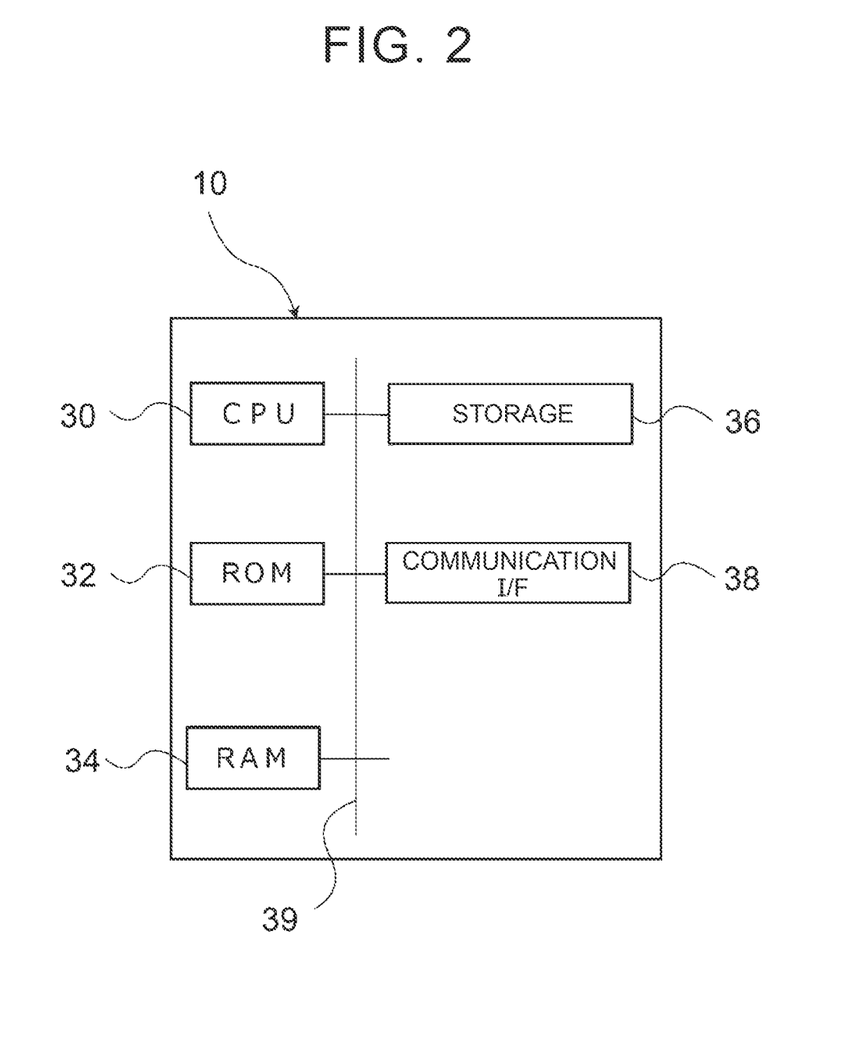
FIG. 2 is a block diagram illustrating a hardware configuration of the information processing device according to the embodiment.

As illustrated in FIG. 2, the information processing device 10 includes a Central Processing Unit (CPU: processor) 30, a Read Only Memory (ROM) 32, Random Access Memory (RAM) 34, a storage 36, and a communication interface (a communication UF) 38. The components are communicably connected to each other via an internal bus 39.

CPU 30 is a central processing unit that executes various programs and controls each unit. That is, CPU 30 reads the program from ROM 32 or the storage 36, and executes the program using RAM 34 as a working area. In addition, CPU 30 performs control of the above-described configurations and various arithmetic processes in accordance with programs recorded in ROM 32 or the storage 36.

ROM 32 stores various programs and various data. RAM 34 temporarily stores a program/data as a working area. The storage 36 is a non-transitory recording medium configured by Hard Disk Drive (HDD) or Solid State Drive (SSD) and storing various programs including an operating system and various types of data. In this embodiment, ROM 32 or the storage 36 stores a display program or the like for performing a display process or the like.

The communication OF 38 is an interface for the information processing device 10 to communicate with the servers 12, the vehicle-mounted device 28, and other devices, and standards such as Controller Area Network (CAN), Ethernet (registered trademark), Long Term Evolution (LTE), Fiber Distributed Data Interface (FDDI), and Wi-Fi (registered trademark) are used.

Hardware Configuration of Vehicle-Mounted Device 28

Figure 3:
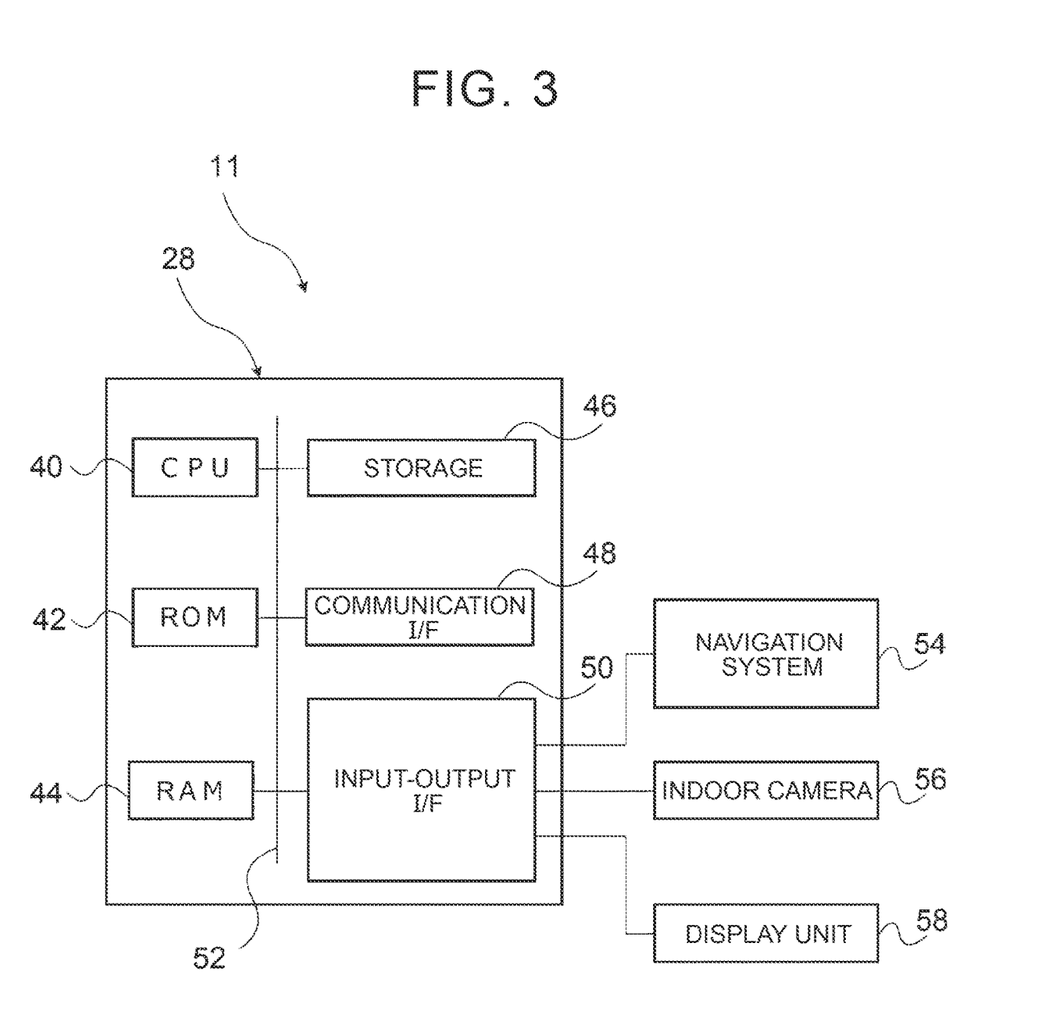
FIG. 3 is a block diagram illustrating a hardware configuration of the vehicle-mounted device according to the embodiment.

As illustrated in FIG. 3, the vehicle-mounted device 28 includes a CPU 40, ROM 42, RAM 44, a storage 46, and a communication interface (a communication UF) 48 and an input/output interface (an input/output UF) 50. Each configuration is communicably connected to each other via an internal bus 52.

CPU 40 is a central processing unit. CPU 40 executes various programs and controls each unit. That is, CPU 40 reads the program from ROM 42 or the storage 46, and executes the program using RAM 44 as a working area. In addition, CPU 40 performs control of the above-described configurations and various arithmetic processes in accordance with programs recorded in ROM 42 or the storage 46.

ROM 42 stores various programs and various data. RAM 44 temporarily stores a program/data as a working area. The storage 46 is constituted by a HDD or a SSD. The storage 46 is a non-transitory recording medium that stores various programs including an operating system and various data.

The communication OF 48 is an interface for the vehicle-mounted device 28 to communicate with servers and other devices, and standards such as Controller Area Network (CAN), Ethernet (registered trademark), Long Term Evolution (LTE), Fiber Distributed Data Interface (FDDI), and Wi-Fi (registered trademark) are used.

A navigation system 54, an indoor camera 56, and a display unit 58 are connected to the input/output OF 50.

The navigation system 44 holds map data. The navigation system 44 formulates a traveling route to a destination set by an occupant or the like. In addition, the navigation system 44 performs various kinds of guidance so that the vehicle 11 can travel along the set traveling route.

The indoor camera 56 is disposed in the vicinity of the steering wheel in the vehicle cabin. The indoor camera 56 is directed toward the face of the occupant. Then, the image data including the face of the occupant captured by the indoor camera 56 is transmitted to the vehicle-mounted device 28.

The display unit 58 is provided at a front portion of the vehicle cabin. The display unit 58 is configured to be capable of displaying information to the driver. The display unit 58 includes, for example, a center display provided on an instrument panel, a meter panel, a projection surface projected by a head-up display device, and the like.

Functional Configuration of the Information Processing Device 10

The information processing device 10 realizes various functions using the above-described hardware resources. A functional configuration realized by the information processing device 10 will be described with reference to FIG. 4.

Figure 4:
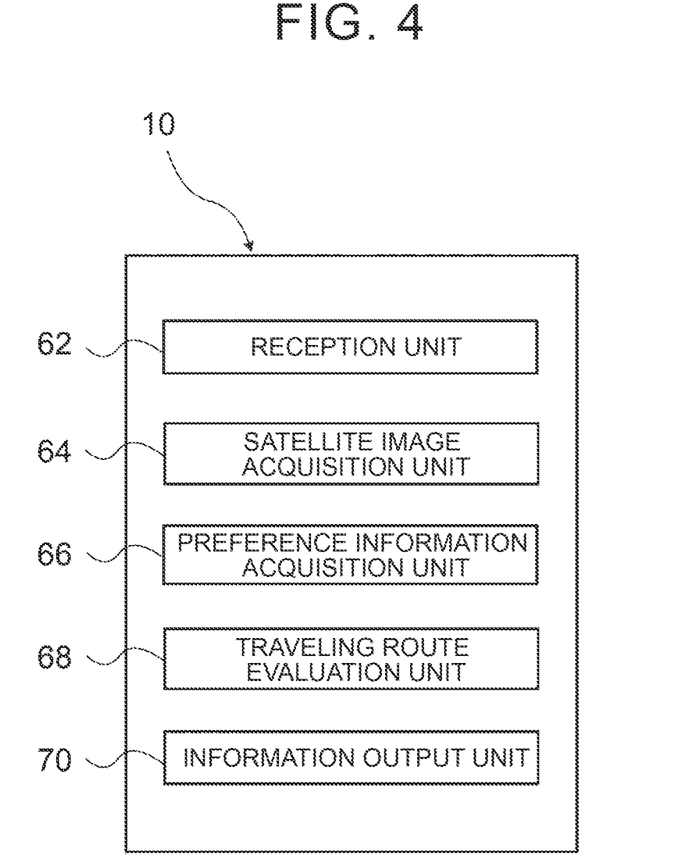
FIG. 4 is a diagram illustrating a functional configuration of the information processing device according to the embodiment.

As illustrated in FIG. 4, the information processing device 10 includes a reception unit 62, a satellite image acquisition unit 64, a preference information acquisition unit 66, a traveling route evaluation unit 60, and an information output unit 70 as a functional configuration. The respective functional configurations are realized by CPU 30 reading and executing a program stored in ROM 32 or the storage 36.

The reception unit 62 accepts a request related to the traveling route search. For example, when a destination is set by an operation of an occupant of the vehicle 11, a route search from the current position of the vehicle 11 to the destination is performed from the vehicle-mounted device 28 to the information processing device 10. The reception unit 62 accepts such a route search instruction.

The satellite image acquisition unit 64 acquires a satellite image captured by the satellite 13. Specifically, the satellite image acquisition unit 64 accesses the server 12, and acquires a satellite image corresponding to a range from the current position of the vehicle 11 to the destination among the satellite images stored in the server 12. The satellite image acquired by the satellite image acquisition unit 64 is, for example, at least one satellite image of a visible image, an infrared image, a water vapor image, a cloud top enhancement image, a true color reproduction image, and an RGB composite image.

The preference information acquisition unit 66 acquires preference information related to the driver's preference. Specifically, the preference information acquisition unit 66 identifies the driver based on the image data captured by the indoor camera 56. The preference information acquisition unit 66 accesses the server 12 and acquires preference information corresponding to the driver from the preference information stored in the server 12.

The preference information includes, for example, information on a road that the driver likes. Further, the preference information includes various kinds of information such as a tendency to prefer a traveling road with a large amount of nature, a tendency to prefer an urban area, a tendency to prefer a mountain road, a tendency to prefer a traveling road with a large straight line, a preference of a plant, a preference of an animal, a preference of alcohol, and the like, and information on a favorite event.

Further, the preference information may include information such as a supermarket frequently used, a department store frequently used, a gas station frequently used, and a parking lot frequently used. Furthermore, the preference information may include information such as a commodity that is frequently purchased.

When the preference information of the driver is not stored in the server 12, the information processing device 10 may prompt the driver to input the preference information via the display unit 58. The preference information input by the driver is stored in the server 12 together with the information of the driver.

The traveling route evaluation unit 68 evaluates the travel route to the destination on the basis of the satellite image and the preference information. Specifically, the traveling route evaluation unit 68 calculates a plurality of traveling routes from the current location to the destination of the vehicle 11 based on a general method. Then, the traveling route evaluation unit 68 identifies a spot having a high degree of association with the preference information from the satellite image. The traveling route evaluation unit 68 increases the evaluation of a traveling route having many spots related to the preference information, and lowers the evaluation of a traveling route having few spots related to the preference information.

For example, if the driver tends to prefer a traveling route with a large amount of nature from the preference information, the traveling route evaluation unit 68 increases the evaluation of the traveling route with a high green visibility on the basis of the satellite image. Further, for example, if the driver tends to prefer a specific type of plant from the preference information, the traveling route evaluation unit 68 increases the evaluation of the traveling route that allows the plant to be visually recognized based on the satellite image. Further, for example, when an event being executed is identified in a range up to the destination based on the satellite image and the event is included in the preference information, the evaluation of the traveling route passing through the spot where the event is being executed is increased.

The information output unit 70 outputs an evaluation result of the traveling route. In the present embodiment, as an example, the information output unit 70 outputs an evaluation result by displaying a traveling route whose evaluation is higher than a predetermined threshold on the display unit 58. At this time, a plurality of traveling routes displayed on the display unit 58 may be proposed to the driver, and the selection of the traveling route may be left to the driver. Further, the traveling route with the highest evaluation may be set and displayed on the display unit 58 in a state in which the traveling route can be changed to another traveling route with a high evaluation. In this case, the information processing device 10 may update the preference information stored in the server 12 in accordance with the traveling route selected by the driver.

Effects

Next, the effect of the present embodiment will be described.

Display Processing

Figure 5:
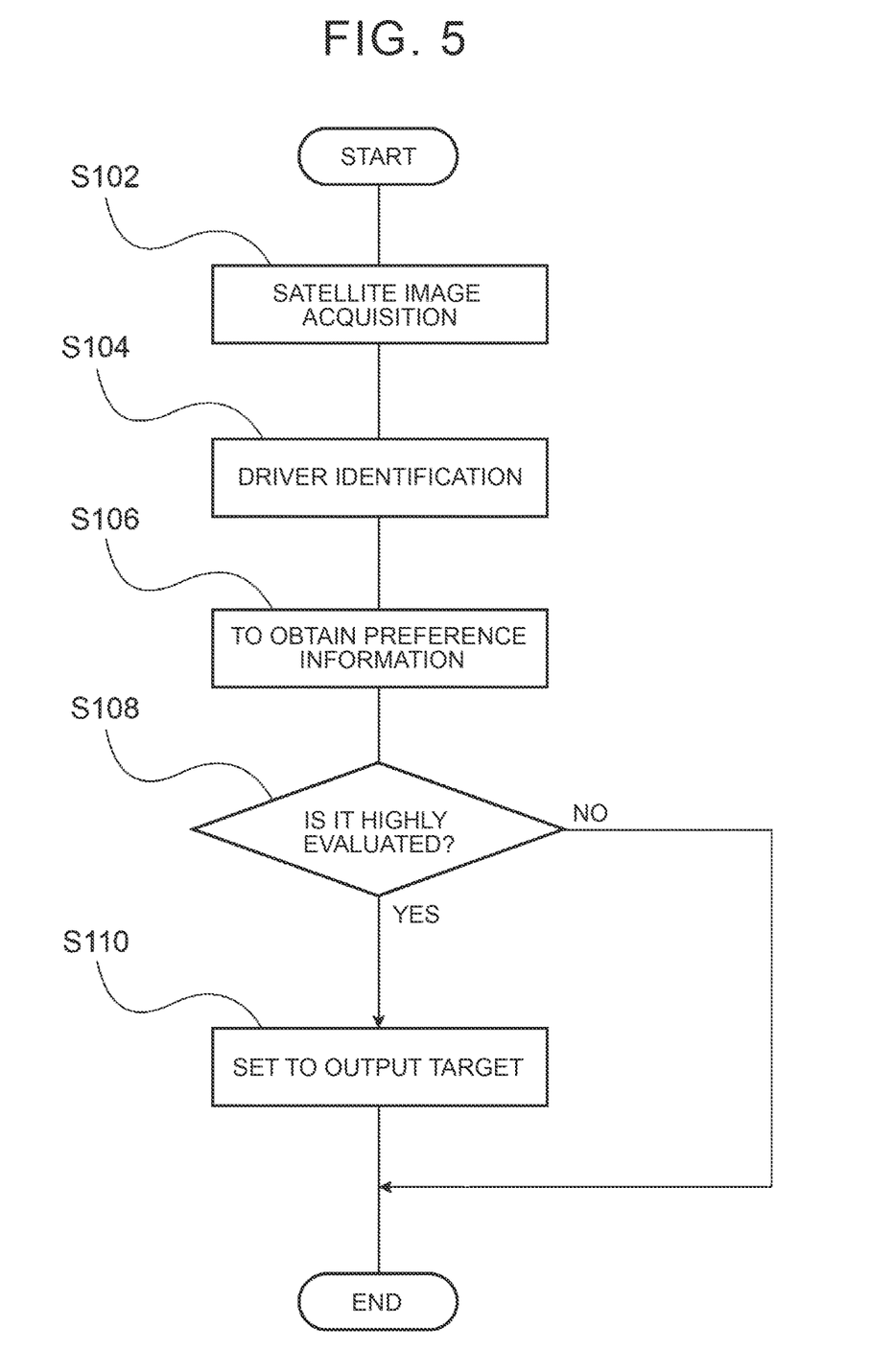
FIG. 5 is a flowchart illustrating an example of a flow of a display process according to the embodiment.

An example of a display process for outputting the evaluation result of the traveling route will be described with reference to a flowchart shown in FIG. 5. This display process is executed by CPU 30 reading the display program from ROM 32 or the storage 36, expanding the program in RAM 34, and executing the program. In the present embodiment, as an example, the display processing is executed when the destination is set by the user.

CPU 30 acquires satellite-images at S102. Specifically, CPU 30 acquires the satellite image corresponding to the range from the present position of the vehicle 11 to the destination by the function of the satellite image acquisition unit 64.

CPU 30 identifies the driver in S104. Specifically, CPU 30 identifies the driver based on images captured by the indoor cameras 56. For example, the driver may be identified by performing pattern matching with the facial data of the driver stored in the server 12.

CPU 30 acquires preference data in S106. Specifically, CPU 30 acquires preference information corresponding to the driver specified by S104 from the servers 12 by the function of the preference information acquisition unit 66.

CPU 30 determines whether or not each of the candidates of the traveling route from the current location to the destination of the vehicle 11 is highly evaluated in S108. Specifically, CPU 30 evaluates the traveling route by the function of the traveling route evaluation unit 68 so that the evaluation of the traveling route highly related to the preference information is high for each of the candidates of the traveling route calculated by the navigation system 44. If there is a traveling route whose rating is higher than the predetermined threshold, an affirmative determination is made as to S108, and the process proceeds to S110 process.

On the other hand, when the evaluations are lower than the thresholds for all the traveling route candidates, S108 is determined to be negative, and the displaying process is ended. In this case, the traveling route is displayed on the display unit 58 for each condition set by the navigation system 44. For example, the traveling route having the shortest required time and the traveling route having the shortest travel distance are preferentially displayed on the display unit 58.

CPU 30 displays, on the display unit 58, a traveling route whose rating is higher than a predetermined threshold in S110. Specifically, CPU 30 displays information on the highly evaluated traveling route on the display unit 58 by the function of the information output unit 70. At this time, information related to the preference information may be added and displayed for each traveling route. For example, when the preference information relates to the green visibility, the green visibility of each traveling route may be displayed. In addition, in a case where the preference information relates to a specific plant, a building, or the like, information such as a plant and a building that can be visually recognized during traveling of each traveling route may be displayed. Then, CPU 30 ends the displaying process.

As described above, according to the information processing device 10 of the present embodiment, the traveling route is evaluated on the basis of the satellite image and the preference information of the driver. Therefore, compared with a configuration in which the traveling route is proposed based only on the landscape information, the traveling route according to the driver's preference can be evaluated more highly. In particular, by using the satellite image, information that cannot be obtained by the information recorded in the server 12 or the like can be obtained in real time. Therefore, it is possible to provide a driving environment with high added value to the driver.

Further, in the present embodiment, the driver can confirm the traveling route with high evaluation by proposing the traveling route with high evaluation to the driver. Furthermore, the preference information is updated in accordance with the information on the traveling route selected by the driver. Thus, even when the preference of the driver changes, the preference information can be maintained in the latest state.

Further, in the present embodiment, it is possible to propose a traveling route having a high green visibility to a driver who prefers a traveling route having a large amount of nature. Similarly, it is possible to propose a traveling route in which the plant is visible to a driver who prefers a particular type of plant.

Furthermore, in the present embodiment, an event being executed in the vicinity of the traveling route can be identified in real time by the satellite image. Therefore, it is possible to notify the driver that the event is being executed. For example, in a case where it is determined that a firework competition is being held based on a satellite image and there is an item related to firework in the preference information, the information of the firework competition can be notified to the driver.

Although the information processing device 10 according to the embodiment has been described above, it is needless to say that the information processing device can be implemented in various forms without departing from the gist of the present disclosure. For example, in the above-described embodiment, the evaluation result of the traveling route is output by being displayed on the display unit 58, but the present disclosure is not limited thereto. The evaluation result of the traveling route may be notified by voice.

In the above-described embodiment, the preference information of the driver is stored in the server 12, but the present disclosure is not limited thereto. The preference information of the driver may be stored in the storage area of the vehicle 11. Further, in the above-described embodiment, the satellite image is acquired from the server 12, but the present disclosure is not limited thereto. A satellite image in a desired range may be acquired by directly or indirectly instructing the artificial satellite 13 to take an image from the vehicle 11 (the vehicle-mounted device 28).

Further, the process executed by CPU 30 by reading the program in the above-described embodiment may be executed by various processors other than CPU 30. Examples of the processor include a Programmable Logic Device (PLD) in which a circuit configuration can be changed after manufacturing of Field-Programmable Gate Array (FPGA), etc., and a dedicated electric circuit that is a processor having a circuit configuration designed exclusively for executing a particular process such as Application Spec Integrated Circuit (ASIC), etc. Further, the above processing may be executed by one of these various processors, or may be executed by a combination of two or more processors of the same type or different types. For example, it may be executed by a plurality of FPGA, a combination of CPU and FPGA, or the like. The hardware structure of each of the various processors is, more specifically, an electric circuit in which circuit elements such as semiconductor elements are combined.

Further, in the above embodiment, the storage 36 is configured to store various data. However, the present disclosure is not limited to this. For example, a non-transitory recording medium (storage medium) such as Compact Disk (CD), Digital Versatile Disk (DVD), and Universal Serial Bus (USB) memories may be used as the storage unit. In this case, various programs, data, and the like are stored in these recording media (storage media).

Furthermore, the flow of the processing described in the above embodiment is an example, and unnecessary steps may be deleted, new steps may be added, or the processing order may be changed without departing from the gist.

What is claimed is:

1. An information processing device of a vehicle including a memory, a navigation system, a display device, and a camera, the information processing device comprising:
    a processor that is communicatively coupled with the memory, the navigation system, the display device, the camera, and a server, wherein
    the processor is configured to:
        acquire, in real time, a satellite image from the server, the satellite image being captured by a satellite in a range from a current position of the vehicle to a destination;
        identify a driver of the vehicle based on an image captured by the camera;
        acquire, from the server, preference information about a preference of the driver;
        identify a plurality of spots associated with the preference information in the satellite image;
        evaluate a plurality of traveling routes to the destination based on the identified spots on the satellite image and the preference information, the traveling routes being acquired from the navigation system; and determine whether an evaluated value of each traveling route of the traveling routes is higher than a predetermined threshold, wherein the processor is further configured to display the one or more traveling routes via the display device in a case where the processor determines that the evaluated value of one or more traveling routes is equal to or higher than the predetermined threshold, and prompt the driver to input the preference information via the display device in a case where the preference information of the driver is not stored in the server.

2. The information processing device according to claim 1, wherein in a case where the acquired preference information includes a preference for nature, the processor is further configured to:

identify, based on the satellite image, green visibility for each traveling route of the traveling routes; and evaluate a traveling route having higher green visibility with a higher evaluated value than a traveling route having lower green visibility.

3. The information processing device according to claim 1, wherein in a case where the acquired preference information includes a preference for a type of plant, the processor is further configured to:

identify, based on the satellite image, whether the type of plant is visible on each traveling route of the traveling routes; and evaluate a traveling route on which the type of plant is more visible with a higher evaluated value than a traveling route on which the plant is less visible.

4. The information processing device according to claim 1, wherein in a case where the acquired preference information includes a preference for a type of an event, the processor is further configured to:

identify the event being executed in the range based on the satellite image, and display information about the event via the display device.

5. The information processing device according to claim 1, wherein the processor is further configured to update the preference information according to the traveling route selected by the driver.

6. The information processing device according to claim 1, wherein the processor is further configured to assign a higher evaluated value to a traveling route including more spots associated with the preference information than a traveling route including fewer spots associated with the preference information.

7. The information processing device according to claim 1, wherein in a case where determination is made that the evaluated value of each traveling route of the traveling routes is lower than the predetermined threshold, the processor is further configured to display a traveling route having a shortest required time via the display device.

8. The information processing device according to claim 1, wherein the processor is further configured to display a first traveling route of the plurality of traveling routes via the display device, the first traveling route has a highest evaluated value.

9. The information processing device according to claim 1, wherein the processor is further configured to acquire the preference information including a preference for a type of area, a type of road, a type of animal, a type of item, or a type of store.

10. An information processing method comprising:

acquiring, in real time, a satellite image from a server, the satellite image being captured by a satellite in a range from a current position of a vehicle to a destination;

identifying a driver of the vehicle based on image captured by a camera of the vehicle;

acquiring, from the server, preference information about a preference of the driver;

identifying a plurality of spots associated with the preference information from the satellite image;

evaluating a plurality of traveling routes to the destination based on the identified spots on the satellite image and the preference information, the traveling routes being acquired from a navigation system;

determining whether an evaluated value of each traveling route of the traveling routes is higher than a predetermined threshold;

displaying the one or more traveling routes via a display device in a case where determination is made that the evaluated value of one or more traveling routes is equal to or higher than the predetermined threshold; and prompting the driver to input the preference information via the display device in a case where the preference information of the driver is not stored in the server.

11. A non-transitory storage medium storing a program for causing a computer to execute processes comprising:

acquiring, in real time, a satellite image from a server, the satellite image being captured by a satellite in a range from a current position of a vehicle to a destination;

identifying a driver of the vehicle based on image captured by a camera of the vehicle;

acquiring, from the server, preference information about a preference of the driver;

identifying a plurality of spots associated with the preference information from the satellite image;

evaluating a plurality of traveling routes to the destination based on the identified spots on the satellite image and the preference information, the traveling routes being acquired from a navigation system;

determining whether an evaluated value of each traveling route of the traveling routes is higher than a predetermined threshold, displaying the one or more traveling routes via a display device in a case where determination is made that the evaluated value of one or more traveling routes is equal to or higher than the predetermined threshold; and prompting the driver to input the preference information via the display device in a case where the preference information of the driver is not stored in the server.

* * * * *